United States Patent [19]

Bergen

[11] Patent Number: 5,768,875
[45] Date of Patent: Jun. 23, 1998

[54] FILTER FABRIC WITH CORE SHEATING THREAD, AND A BAG PRODUCED THEREFROM

[75] Inventor: Eberhard Bergen, Emmenbrücke, Switzerland

[73] Assignee: Rhone-Poulenc Viscosuisse S.A., Emmenbruecke, Switzerland

[21] Appl. No.: 746,763

[22] Filed: Nov. 15, 1996

Related U.S. Application Data

[63] Continuation of Ser. No. 335,836, filed as PCT/CH94/00054, Mar. 14, 1994, abandoned.

[30] Foreign Application Priority Data

Mar. 17, 1993 [CH] Switzerland ................ 802/93

[51] Int. Cl.⁶ .................. D02G 3/02; D02G 3/36
[52] U.S. Cl. ................. 57/225; 57/210; 57/224; 57/235; 280/739; 280/743.1
[58] Field of Search .................. 280/739, 728.1, 280/743.1; 57/210, 224, 225, 235

[56] References Cited

U.S. PATENT DOCUMENTS

| | | | |
|---|---|---|---|
| 2,217,826 | 10/1940 | Van Laer | 57/210 |
| 4,202,382 | 5/1980 | Westhead | 139/383 |
| 4,840,397 | 6/1989 | Katz et al. | 280/739 |
| 5,073,418 | 12/1991 | Thorton et al. | 428/34.9 |
| 5,093,163 | 3/1992 | Krummheuer et al. | 428/35.1 |
| 5,178,408 | 1/1993 | Barrenscheen et al. | 280/728.1 |
| 5,215,795 | 6/1993 | Matsumoto et al. | 57/224 |
| 5,236,775 | 8/1993 | Swoboda et al. | 280/728.1 |
| 5,356,680 | 10/1994 | Krummheuer et al. | 280/728.1 |
| 5,370,925 | 12/1994 | Koeseki | 280/728.1 |

FOREIGN PATENT DOCUMENTS

| | | |
|---|---|---|
| 454213 | 4/1991 | European Pat. Off. . |
| 501295 | 2/1992 | European Pat. Off. . |
| 523546 | 7/1992 | European Pat. Off. . |
| 3644554 | 4/1988 | Germany . |
| 5-213139 | 8/1993 | Japan . |
| 9315138 | 5/1993 | WIPO . |
| 93/15138 | 8/1993 | WIPO . |

*Primary Examiner*—William Stryjewski
*Attorney, Agent, or Firm*—Michael J. Striker

[57] ABSTRACT

The invention concerns a filter fabric consisting of a core yarn having a reversible elongation of at least 20 to 50%, the fabric being intended for use in the manufacture of airbags for vehicles. The yarn consists of a thermally stable thermoplastic core filament yarn (1) round which is braided or spun a heat-resistant outer layer (2) or which is coated, or coated by vapor deposition, with a heat-resistant layer (2).

12 Claims, 2 Drawing Sheets

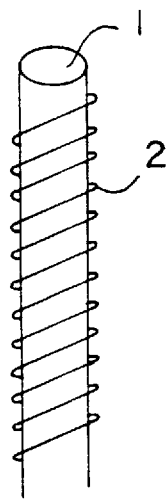
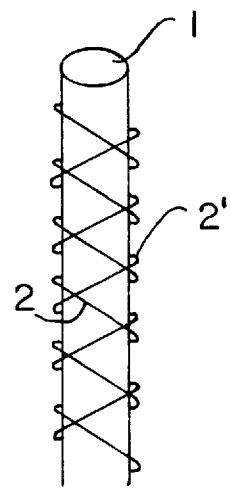
FIG.1a    FIG.1b
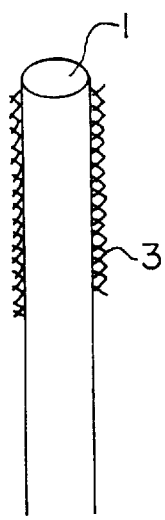
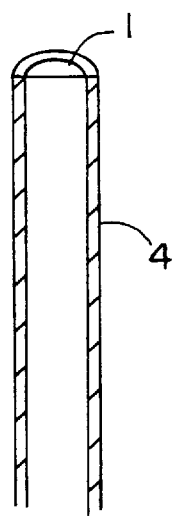
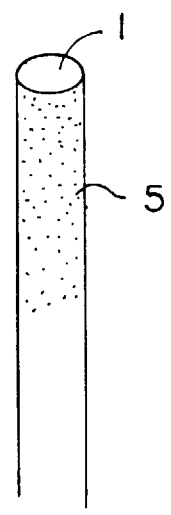
FIG.2    FIG.3    FIG.4

FILTER FABRIC WITH CORE SHEATING THREAD, AND A BAG PRODUCED THEREFROM

This is a continuation of application Ser. No. 08/335,836, filed as PCT/CH94/00054, Mar. 14, 1994, now abandoned.

BACKGROUND OF THE INVENTION

The present invention is directed to a woven filter fabric having a core/sheath thread with a reversible fabric elongation of 20% to 50% for the manufacture of inflatable airbags for vehicles.

Airbags as impact protection devices for passengers of a motor vehicle are known (U.S. Pat. No. 4,840,397). In the known airbags, a portion of the walls is constructed as a woven filter fabric. The filter fabric is made up of a mixture of aramid fibers and polyamide fibers. Aramid/polyamide fabrics woven from staple fibers were chosen in view of their coarseness and dimensional stability. The coarseness ensures a better filtering effect on particles in the air. Pore density is also more uniform when staple fibers or spinning fibers are used.

However, woven fabrics produced from spun yarns have the disadvantage that they are more expensive to produce than filament yarns. When used as a raw material for fibers, aramid has the disadvantage that the fabric elongation or springiness is too limited so that the passage of air is delayed. The tear propagation resistance is also inadequate. Aramid is very expensive to produce.

SUMMARY OF THE INVENTION

The object of the present invention is to provide a heat-resistant air-permeable woven fabric which is suitable for uncoated filter fabrics, in particular for airbags, and can be manufactured economically, and airbag produced therefrom.

This object is met according to the invention by a core thread produced from a heat-stabilized thermoplastic filament yarn. Preferred heat-stabilized polyamide yarns have heat resistance properties based on Cu/I in yarn, as described, e.g., in WO 93/15138.

The advantage of a thermoplastic filament yarn used as core thread or foundation thread compared to aramid consists in the improvement in processing to form a woven fabric. Polyamide or polyester are substantially simpler and accordingly more economical to manufacture than the known aramid materials. Preferred polyamide materials are Polyamide 66, Polyamide 6 or Polyamide 46; polyethylene terephthalate is preferred as polyester.

The air-permeability is 30 to 100 l per $dm^2$/min, in particular 30 to 80 l pro $dm^2$/min, preferably 25 to 80 l pro $dm^2$/min, and a pressure of 500 pa. The polyamide core thread has the advantage that it permits any desired elongation, depending on its manufacture, between 20% and 50%, in particularly 25%–30%, preferably 30%, with respect to the length of the filament when not stretched.

In a preferred embodiment form, a sheathing of yarn or twisted yarn is provided around the core thread using the core twisting process. Any heat-stable yarn or twisted yarn may be used for this purpose.

In a variant, the core thread is provided with a sheathing or outer layer in the core spinning process, as it is called. The sheathing can be achieved using heat-stabilized or particularly heat-resistant fibers or yarn, e.g., made of aramid or imid.

In another variant, the core thread is coated with a particularly heat-resistant or heat-conducting compound such as PVC. The coating is applied only to the thread and not to the woven fabric.

In a further variant, the core thread is coated by vapor deposition, preferably with copper.

The sheathing thread is preferably made from heat-stabilized fiber material. The fiber material can be aramid, for example. The yarn can be used both as thread and as slubbing. The slubbing can be made of heat-stabilized staple or spinning fibers. The spinning fibers, in turn, have the advantage of an additional filtering effect during pyrolysis when the airbag is used so that occurring particles are retained.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1a shows a core thread with a single-ply covering for airbags in accordance with the present invention;

FIG. 1b shows a core thread with a two-ply covering for airbags in accordance with the present invention;

FIG. 2 shows a core thread with a spun covering for airbags in accordance with the present invention;

FIG. 3 shows a coated core thread for airbags in accordance with the present invention;

FIG. 4 shows a core thread coated by vapor deposition for airbags in accordance with the present invention.

DESCRIPTION OF PREFERRED EMBODIMENTS

Figure 5:
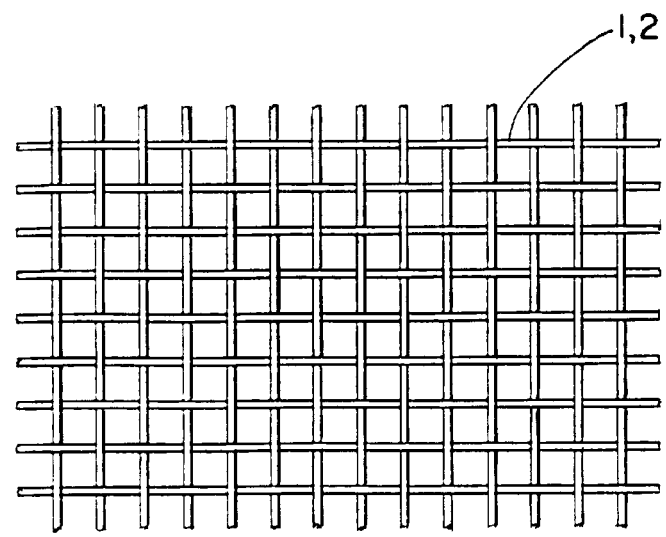
FIG. 5 shows a fabric for a filler.
Figure 6:
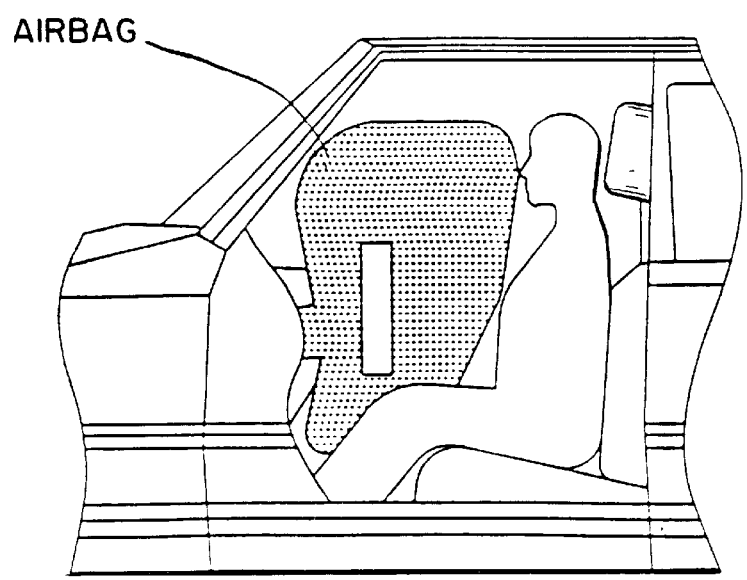
FIG. 6 shows an airbag.

In FIG. 1a, a core thread 1 made of a Polyamide 66 filament yarn is covered by a single wrapping of yarn or twisted yarn 2.

In FIG. 1b, the core thread 1 is covered with a yarn or twisted yarn 2 and a yarn or twisted yarn 2'. The yarns or twisted yarns 2 and 2' can be produced from identical or different fiber mixtures or twisted yarns.

In FIG. 2, spinning fibers 3 are spun around the core thread 1. The spinning fibers 3 can be enclosed additionally by an accompanying thread, not shown, for reinforcement.

In FIG. 3, the core thread 1 is coated with a plastic 4.

In FIG. 4, a metal coat 5 is deposited on the core thread 1 as a heat shield.

The invention is described more fully with the aid of examples whose results are shown in the following table:

TABLE 1

| Examples | 1 | 2 | 3 |
|---|---|---|---|
| thread: | | | |
| core PA 6.6% | 86 | 72 | 72 |
| sheathing spun slubbing % | 14 | 28 | 28 |

TABLE 1-continued

| Examples | 1 | 2 | 3 |
|---|---|---|---|
| titer | 402 | 399 | 398 |
| reversible fabric elongation | | | |
| warpwise % | 40 | 27 | 35 |
| weftwise % | 43 | 28 | 41 |
| tearing resistance N/5 cm | | | |
| warpwise | 2406 | 2269 | 2158 |
| weftwise | 2202 | 1907 | 2077 |
| tear propagation resistance N | | | |
| warpwise | 125 | 135 | 90 |
| weftwise | 120 | 131 | 83 |
| air permeability | | | |
| 1 per dm²/min | 70 | 95 | 90 |

The woven filter fabric according to the invention is especially suitable for the manufacture of safety airbags in vehicles, particularly in automobiles, busses and aircraft. However, it may also be used wherever a rapid compensation of air pressure must be effected accompanied by a simultaneous filtering action.

It will be understood that each of the elements described above, or two or more together, may also find a useful application in other types of constructions differing from the types described above.

While the invention has been illustrated and described as embodied in a filter fabric for airbags and airbag produced therefrom, it is not intended to be limited to the details shown, since various modifications and structural changes may be made without departing in any way form the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An uncoated fabric for an inflatable airbag of a vehicle, comprising a core sheathing thread and a reversible fabric elongation of more than 30%–50% in warp and weft directions, said core sheathing thread having a core thread of heat-stable thermoplastic filament yarn.

2. An uncoated fabric as defined in claim 1, wherein said yard is composed of polyamide.

3. An uncoated fabric as defined in claim 1, where the filter fabric has an air permeability of 30–100 1 per dM²/min at a pressure of 500 pa.

4. An uncoated fabric as defined in claim 1, wherein said core sheathing thread has an outer layer twisted around said core thread.

5. An uncoated fabric as defined in claim 1, wherein said core sheathing thread has a sheathing thread composed of a heat-stabilized fiber material.

6. An inflatable airbag for a vehicle, consisting of an uncoated fabric including a core sheathing thread and a reversible fabric elongation of 30%–50% in warp and weft directions, said core sheathing thread having a core thread of heat-stabilized thermoplastic filament yarn.

7. An inflatable airbag as defined in claim 6, wherein said yarn is composed of polyamide.

8. An inflatable airbag as defined in claim 6, wherein the filter of fabric has an air permeability of 30–100 1 per dm²/min at a pressure of 500 pa.

9. An inflatable airbag as defined in claim 6, wherein said core sheathing thread has an outer layer twisted around said core thread.

10. An inflatable airbag as defined in claim 6, wherein said core sheathing thread has a sheathing thread composed of a heat-stabilized fiber material.

11. An uncoated fabric for an inflatable airbag of a vehicle, having a core sheathing thread and a reversible fabric elongation of 30%–50% in warp and weft directions, said core sheathing thread having a heat-stabilized thermoplastic filament yarn, said yarn being composed of polyamide.

12. An inflatable airbag for a vehicle, consisting of an uncoated fabric having a core sheathing thread and a reversible fabric elongation of 30%–50% in a warp and weft directions, said core sheathing thread having a core thread of heat-stabilized thermoplastic filament yarn, said yarn being composed of polyamide.

* * * * *